CHARACTER ASSEMBLY AND DISTRIBUTION APPARATUS

Filed Oct. 15, 1962 4 Sheets-Sheet 1

INVENTORS
CHARLES H. GILLEY
JAMES R. KERSEY
ROBERT M. TOMASULO
FREDRICK M. TRAPNELL JR.

BY Gunter A. Hauptman
ATTORNEY

March 21, 1967 C. H. GILLEY ETAL 3,310,780

CHARACTER ASSEMBLY AND DISTRIBUTION APPARATUS

Filed Oct. 15, 1962 4 Sheets-Sheet 2

CHARACTER ASSEMBLY AND DISTRIBUTION APPARATUS

March 21, 1967 C. H. GILLEY ETAL 3,310,780

CHARACTER ASSEMBLY AND DISTRIBUTION APPARATUS

Filed Oct. 15, 1962 4 Sheets-Sheet 4

United States Patent Office 3,310,780
Patented Mar. 21, 1967

3,310,780
CHARACTER ASSEMBLY AND DISTRIBUTION APPARATUS

Charles H. Gilley and James R. Kersey, Poughkeepsie, and Robert M. Tomasulo, Staatsburg, N.Y., and Frederick M. Trapnell, Jr., Winchester, England, assignors to International Business Machines Corporation, New York, N.Y., a corporation of New York Filed Oct. 15, 1962, Ser. No. 230,408
10 Claims. (Cl. 340—172.5)

This invention relates to electronic apparatus. More particularly, this invention relates to electronic communications apparatus for assembling serially received elements into characters and for distributing characters as serial elements.

This invention is intended to be used with a message switching exchange of the type described in previously filed copending applications, Ser. No. 196,671, filed May 22, 1962, "Memory Allocation," R. M. Tomasulo et al., assigned to International Business Machines Corporation, and Ser. No. 198,841, filed May 31, 1962, "Synchronizing Apparatus," J. R. Kersey et al., assigned to International Business Machines Corporation, which are incorporated herein by this reference. Messages are transmitted from destination to destination within a telegraph network in a variety of codes. Normally the codes comprise a plurality of serially transmitted bi-valued elements or "bits." If the standard Teletype code is used, the first element transmitted is a "start" element having a binary value of one and the last element transmitted is a "stop" element having a binary value of zero. Normally in this code, five information elements are transmitted between the start element and the stop element, indicating by permutations of their binary values any one of 32 numeric, alphabetic or special characters. The start element and the stop element are called "invariable elements" since they always have a fixed binary value, the five information elements being called "variable" elements since each may assume either binary value.

The purpose of the start and stop elements in the standard Teletype code is to synchronize a typewriter at a source with a printer at a destination. If the typewriter and printer are synchronized independently, the invariable start/stop elements may be eliminated and a code having only "variable" elements may be adopted. For example, communications between electronic data processing systems and their peripheral input/output devices are normally conducted in a seven-element code wherein any element may assume either of the binary values one or zero.

The numbers of elements assigned to a discrete group of elements or "characters" is usually fixed in any one system of communication, but differs as among systems. Thus, it is not unusual to find Teletype code characters comprising more than, or less than, two invariable and five variable elements. Further, it is common to find computer codes which comprise characters having more, or less, than seven variable elements. Modern electronic message switching exchanges must be capable of handling communication among many types of devices, including: typewriters, printers, magnetic tape units, magnetic disc files, computers, card readers, etc. It is obvious, therefore, that a modern electronic message switching exchange must handle information conveyed in a variety of codes having a wide range in the number of variable elements, and possibly having invariable elements. Apparatus is found in the prior art for handling codes having a fixed number of variable elements. Also found in the prior art, is apparatus for handling codes having a fixed number of variable and invariable elements. Further, the prior art discloses apparatus capable of handling codes having only variable elements or alternatively, codes having variable and invariable elements, each, however, having a fixed number of elements. None of these prior art schemes permit an electronic message switching exchange to handle codes having different numbers of elements, some of which may be either variable or invariable.

It is therefore an object of this invention to provide apparatus for assembling and distributing characters represented by a variety of codes having different numbers of elements, some of which are variable elements and some of which may be either variable or invariable elements.

A further object of this invention is to assemble and distribute characters expressed in a plurality of codes, some comprising all variable elements and some comprising mixed variable and invariable elements.

Another object of this invention is to provide apparatus for specifying the number of elements, in a code, representative of characters being assembled and distributed.

An additional object of this invention is to provide a character assembler operable with multielement codes wherein a wide range in the number of elements may represent a character.

Still another object of this invention is to provide apparatus for assembling elements into characters wherein the number of elements manifesting a character is flexible and wherein all of the elements may be variable elements and wherein some of the elements may be variable and others invariable.

Still another object of this invention is to provide apparatus for distributing the elements of a character wherein the number of elements comprising a character may fall within a large range.

A still further object of this invention is to provide apparatus for distributing characters which may comprise elements either wholly variable or partially variable and partially invariable.

The apparatus of this invention achieves these objects by provision of a shift register, a character length register, a character control counter, a comparator and a start-stop detector. During reception (assembly), information is received serially by element (bit) from a line and after assembly is sent parallel by character to a central processor. During transmission (distribution), characters are transferred in parallel from the processor and are sent serially by bit onto the line. The character length register stores a value indicative of the number of elements comprising a character in any selected code.

Assuming that during the transmission of a character on a line that all elements in the chosen code are variable, the character is placed in the lower orders of the shift register and is sent bit by bit onto the line from the lowest order of the shift register. New elements are placed in the lowest order of the shift register by shifting the shift register toward the low orders for each element transmitted on the line. The character control counter is incremented each time that the shift register is shifted. When the value in the character length register bears a predetermined relationship to the current value in the character control counter, the comparator will indicate that a complete character has been sent onto the line and will call for a new character to be transferred to the shift register from the processor. If, on the other hand, some of the elements are invariable the operation will nevertheless be the same.

During reception of character elements from the line serially by element, if all of the elements are assumed variable, elements will be entered into a position of the shift register fixed by the character length register. The shift register is shifted one position toward the lower orders for each element entered, emptying the entry position for the receipt of the next element. The character control counter is incremented for each shift of the shift register. The comparator will indicate when a predetermined relationship between the value in the character length register and the current value of the character control counter exists, the contents of the shift register being transferred to the processor when this occurs. Other elements in the shift register, bearing no relation to the assembled character, may be "masked" out during transfer of the character from the register to the processor. If, on the other hand, the character being received is in a code having invariable elements, the start-stop detector is used to recognize the presence of a start element in the lowest order of the shift register and the entry of a stop element into the position of the shift register fixed by the character length register. When these invariable elements are recognized, the shift register is shifted one extra time in order to "strip" the start element from the character. The stop element may, if necessary, be "masked" out during transfer of the character from the register to the processor, though usually it has a value which is automatically ignored by the processor.

The foregoing and other objects, features and advantages of the invention will be apparent from the following more particular description of the preferred embodiment of the invention, as illustrated in the accompanying drawings.

In the figures:

FIGURE 1*a* is a generalized block diagram showing a portion, of apparatus utilizing the invention, used during reception of characters having only variable elements.

FIGURE 1*b* is a generalized block diagram of apparatus embodying the invention showing elements used during the transmission of characters.

FIGURE 1*c* is a generalized block diagram illustrating apparatus embodying the invention showing only those elements used during reception of characters in codes having both variable and invariable elements.

FIGURES 2*a* and 2*b* when placed adjacent each other form a logic diagram illustrating apparatus which embodies the invention.

FIGURE 2*c* is a line drawing showing the format of a memory word used with the apparatus shown in FIGURES 2*a* and 2*b*.

FIGURES 3*a*, 3*b*, 3*c* and 3*d* are pulse diagrams illustrating signals present during operation of the apparatus shown in FIGURES 2*a* and 2*b*.

GENERAL DESCRIPTION

FIGURES 1*a*, 1*b* and 1*c*, for ease of exposition, show elements of apparatus embodying the invention used during four "modes" of operation. Modes of operation are determined by the use (assembly or distribution) to which the apparatus is put and the type of code ("synchronous," i.e., having only variable elements, or "start-stop," i.e., having variable elements plus two invariable elements) being operated upon. The apparatus is said to be in the first mode of operation when it is assembling synchronous characters, and in the second mode when it is assembling start-stop characters. It is said to be in the third mode during distribution of synchronous characters and in the fourth mode during distribution of start-stop characters. The same parts of the apparatus are in general used, though for different purposes during operation in modes 1, 3 and 4. Mode 2 utilizes some of the same parts plus others.

Referring first to FIGURE 1*a*, mode 1 (the reception of "synchronous" characters having only variable elements) will be explained. Bits (or elements) are received serially on a line 5 which is sampled into an assembly/distribution shift register 1 at a first time *t*1 via a gate 7. The shift register 1 has twelve orders, each order being capable of receiving one bit from the line 5. A wiper 59 is set by signals on a line 55 to select one of twelve inputs to the twelve orders of shift register 1, in accordance with a value ($n$), which may designate a character length of from one to eleven elements, stored in a character length register 2. Once the character length register 2 has caused the wiper 59 to be set to select one of the orders (one higher than the value $n$) of the shift register 1, every successive bit on the line 5 will be entered into the same order ($n+1$) of the shift register 1. All the orders of the shift register 1 are shifted right (toward the lower orders) one position at an arbitrarily chosen second time *t*2. The shifting may be performed prior to, the same as, or later than the first time *t*1. The shifting is, for explanation, only performed at time *t*2 after time *t*1. Thus the bit from the line 5 entered into an order ($n+1$) of the shift register 1 at time *t*1, will at time *t*2 be shifted one order to the right (to order $n$), leaving room for the entry of the next bit from the line 5. The contents ($m$) of a character control counter 3 are increased by one at a third time *t*3, keeping a record of the number of elements currently received from the line 5. If the valve ($n$) in the character length register 2 bears a predetermined relationship (which is an equality for purposes of explanation to the current value ($m$) recorded in the character control counter 3) a comparator 4 emits a signal ($n=m$) on line 62. The line 62 is interrogated regularly at a fourth time *t*4 by sampling a gate 11. An output from gate 11 indicates that the number of elements received from the line 5 equals the character length specified by the value ($n$) in the character length register 2, the gate 8 being, as a result, enabled to transfer the assembled character from the shift register 1 to a processor via the cable 60. The method of synchronization (i.e. recognition of the beginning element of a character) employed may result in the presence of undesired elements in the higher orders of the shift register 1, in addition to the elements of the character. The undesired elements may be "masked" out by means of a signal on the line 57 from the character length register 2 which sets the illustrative ganged contacts 56 to mask all undesired elements held in orders higher than the highest ($n$) order of the assembled character.

The operation may be understood if, for example, it is assumed that the character length register initially specifies a value $n=9$ and that the character control counter 3 is set to the value $m=0$. During assembly, nine elements will be received from the line 5 by the shift register 1 before the assembled character is sent to the processor via the cable 60. The value ($n$) nine is placed into the character length register 2. As a result, the wiper 59 is set to enter elements into the tenth order of the shift register 1, and the contacts 56 are adjusted to transfer to the processor elements one through nine from orders one through nine of the shift register 1. Each of the character elements received from the line 5 is entered in turn into the tenth order of the shift register 1 at time *t*1 and is then at time *t*2 shifted to the ninth order. The character control counter will be incremented once, at each time *t*3, after each shift of the shift register 1. After nine shifts of the shift register 1, the counter 3 will contain the same value ($m=9$) as the value ($n=9$) stored in the character length register 2. The entire nine-element character is now held in the lowest nine orders of the shift register 1. The comparator places a signal ($n=m$) on the line 62, which signal is applied at time *t*4 via the gate 11 to gate 8, sending the character assembled in the lower nine orders of the shift register 1 to the processor in parallel via cable 60. Since the contacts 56 are arranged to transfer only the lowest nine orders from the shift register 1, the undesirable higher order elements will be masked.

Referring now to FIGURE 1*c*, mode 2 (the reception of characters in a code having two invariable elements) will be described. The reception of elements present on the line 5 and their entry into the shift register 1 via the gate 7 and the wiper 59 is identical to that described with reference to FIGURE 1*a*. The character length register 2 specifies a value ($n$) equal to the total number of elements in the character being received on the line 5 as described with reference to FIGURE 1*a*. When the shift register 1 has been shifted a number ($n$) of times specified by the character length register 2, the elements received on the line 5 will have been shifted into the low orders of the shift register 1. The first invariable element (a start bit, which usually has a logical value of "one") will at this time be in the lowest (first) order of the shift register; the second invariable element (stop bit, which usually has a logical value of "zero") having previously been applied to the wiper 59. The start-stop detector 14 recognizes these two conditions (i.e. a "one" in the lowest order of shift register 1 and a "zero" on the line 5) via lines 48 and 58, causing a recognition signal to occur on the SS line 47. The shift register 1 is activated, by the application of this signal to gate 13, at time $t3$ to shift the start bit out of the lowest order and off the end of the shift register 1. A time $t4$, the recognition signal passes through gate 12 to activate the gate 8 to transferring onto the cable 60 the contents of the shift register. The stop bit is eliminated or "masked" automatically since its "zero" value is identical to the initial values placed in the shift register 1. All orders of the shift register 1 higher than the stop-bit should also have a "zero" value since synchronizing operations of the type described with reference to mode 1 (FIG. 1*a*) are not required when start-bits and stop-bits are used. However, the masking circuitry of FIG. 1*a* may be utilized during assembly of start-stop characters if the stop-bit has the non-standard value of a logical "one," or if logical "ones" are for some reason present in higher orders of the register 1.

The operation of the circuits in mode 2 is similar to mode 1. For example, if the received character has eleven elements (nine variable ones and two invariable), the value ($n$) eleven is placed into the character length register 2. As a result, the wiper 59 is set to place each element in turn into the twelfth order of the shift register 1. Each of the character elements received from the line 5 is at a time $t1$ entered into the twelfth order of the shift register 1 and is then, at time $t2$, shifted to the eleventh order. Eventually, the first (start) element will be shifted into the first order of the shift register 1 and the stop element will be received in the twelfth order and shifted into the eleventh order of the shift register 1. The entire eleven-element character is now held in the lowest eleven orders of the shift register 1. An extra shift of the shift register 1 is taken at time $t3$, placing the stop bit in the tenth order of the shift register and "stripping" the start bit. Since the stop bit is a logical zero, only the lowest nine orders from the shift register 1, are significant. The entire register contents (nine variable elements) are, at time $t4$, transferred to cable 60.

Referring now to FIGURE 1*b*, modes 3 and 4 (the transmission of characters having any number of variable or invariable elements) will now be described. Initially, the elements of the character are placed in the low orders of the shift register 1 with the lowest order element of the character placed in the lowest order of the shift register 1. The character length register 2 contains a value ($n$) indicating the number of elements in the character being transmitted. At time $t1$ the lowest order of the shift register is transmitted on the line 50 via the gate 10, and at time $t2$ the shift register 1 is shifted toward the low orders to bring the next element of the character into the lowest order. At time $t3$, the character control counter (which initially contains a zero) is incremented to indicate the current number ($m$) of elements sent on the line 50. These operations are repeatedly performed until the comparator 4 recognizes a predetermined relationship between the value ($n$) in the character length register 2 and the current value ($m$) in the character control counter 3. When this occurs, a signal ($n=M$) will appear on line 62 and will at time $t4$ be applied to gate 9 to transfer a new character from the processor to the shift register 1.

*Detailed description—Structure*

Figure 1A:
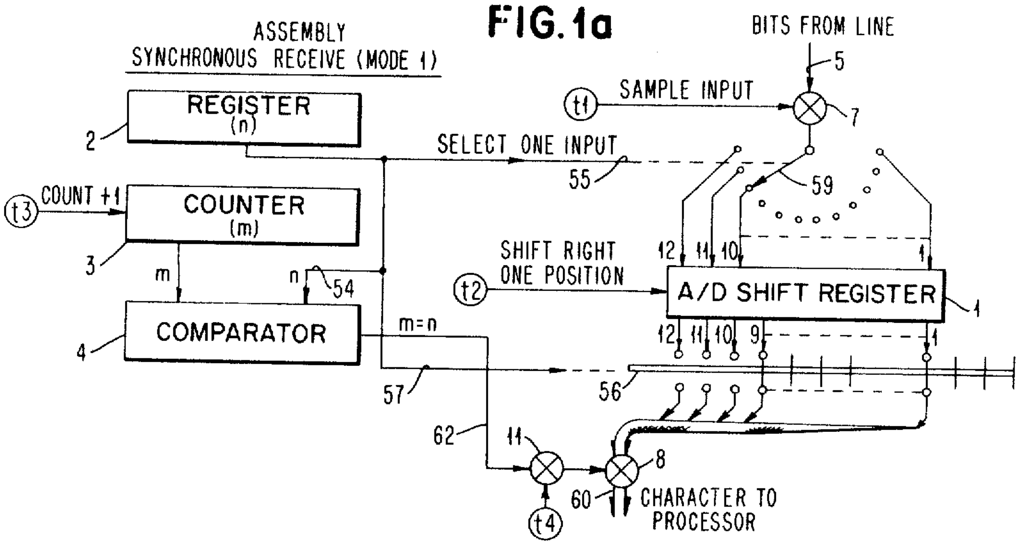
Figures 1B, 1C:
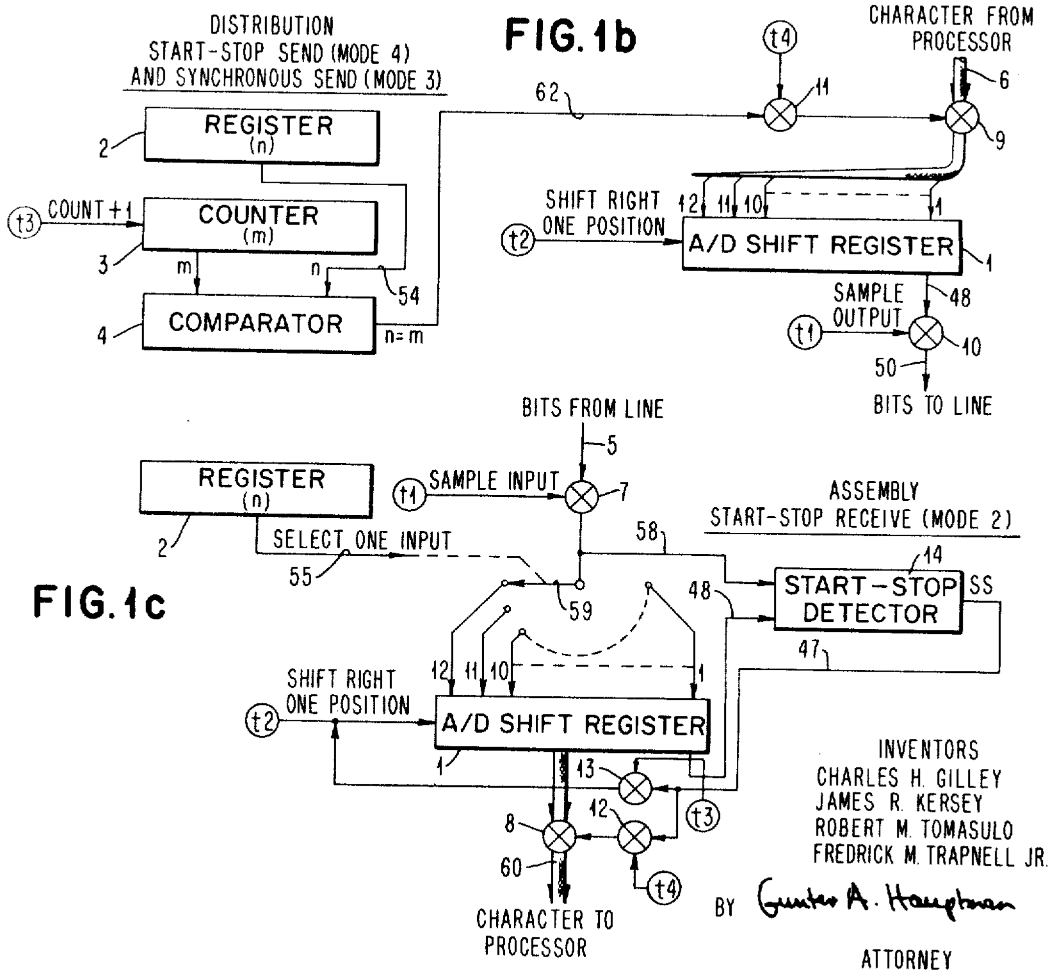
Figure 2A:
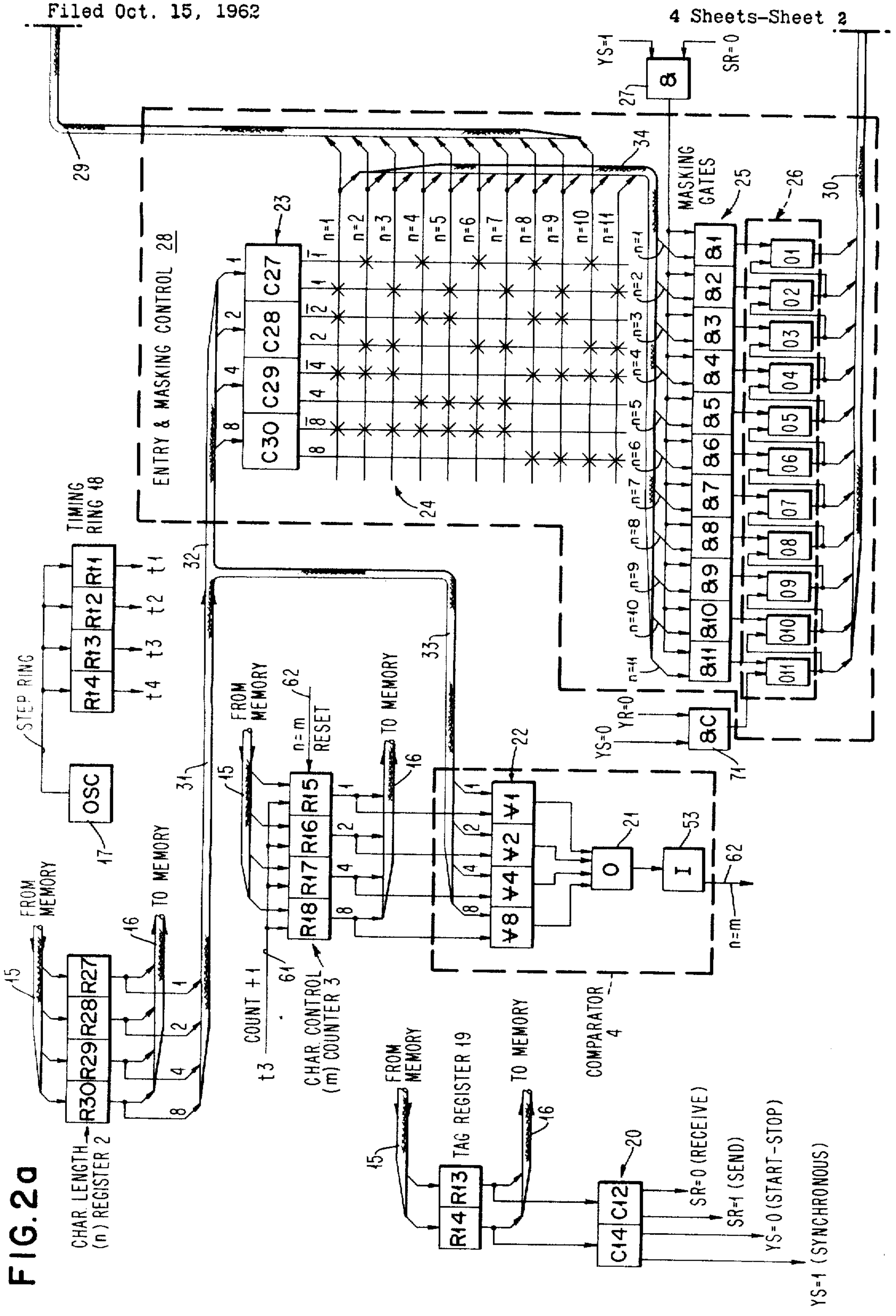
Figures 2B, 2C:
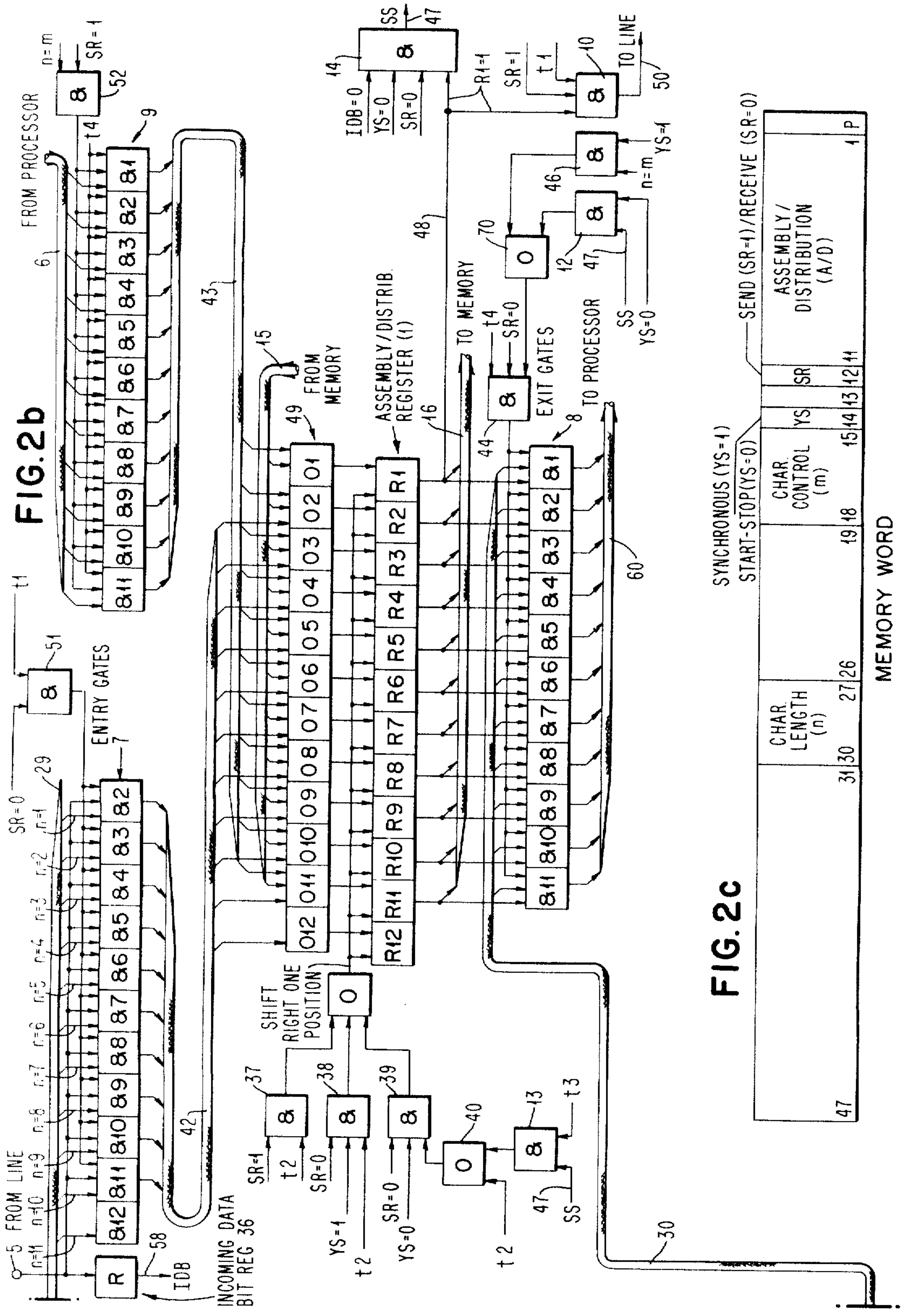

Referring now to FIGURES 2*a*, 2*b* and 2*c* there will now be described apparatus embodying the invention. In the previously mentioned patent applications "Memory Allocation" to R. M. Tomasulo et al. and "Synchronizing Apparatus" to J. R. Kersey et al., there is described apparatus shared in common by a large number of incoming and outgoing telegraph lines. The technique used to permit many lines to share one set of circuitry is that of providing "word" locations in memories wherein are stored the conditions of the circuitry for each telegraph line. Whenever a telegraph line is connected to the circuitry, the corresponding location in the memory is addressed and the "word" at that location is used to restore the circuitry to the conditions in existence the last time that the line was connected to the circuitry. In this way, the memory permits one set of circuits to be shared by many telegraph lines. One of the memory "words" is shown in FIGURE 2*c* wherein the sections not necessary to the practice of this invention are omitted. It will be understood that the apparatus of FIGURES 2*a* and 2*b* is used by more than one line (the lines shown in fact connecting to a plurality of lines via a scanner), there being provided a different memory word of the type shown in FIGURE 2*c* for each line.

The memory word shown in FIGURE 2*c* comprises 48 bit positions (including a parity bit) arranged into tags and fields, of which three fields and two tags are of interest here. An 11-bit assembly distribution field (bit positions 1–11) is used for the assembly of eleven or less serial bits into characters and the distribution of characters as a series of eleven or less bits. A 4-bit character length field (bit positions 27–30) is used to store a value ($n$) indicating the number of elements being assembled in, or distributed from, the assembly distribution field. Since the 11-bit assembly distribution field may be used for assembling and distributing any number of character elements from one through eleven, the character length field may indicate any value ($n$) from one through eleven. A 4-bit character control field (bit positions 15–18) is used to indicate a value ($m$) related to the number of bits assembled in, or distributed from, the assembly distribution field. A send receive (SR) tag bit (position 12) is provided to indicate whether the assembly distribution field is used for character assembly ($SR=0$) during reception or for character distribution ($SR=1$) during transmission. A synchronous/start-stop (YS) tag bit (position 14) is used to indicate whether characters being handled are of the synchronous ($YS=1$) or of the start-stop ($YS=0$) variety. Synchronous characters are those having all variable elements, while start-stop characters are those having a first invariable element and a last invariable element enclosing variable elements. Other codes, similar to the start-stop code, having more or less than two invariable elements are within the scope of this invention. Also, it is apparent that the size of the memory word fields may be varied to permit a longer, or smaller, number of elements to be handled.

Referring to FIGURES 2*a* and 2*b*, the registers 1, 2, 3 and 19 together receive and hold memory words from a memory via cable 15 prior to the connection of a line associated with the memory word to lines 5 (used during assembly) and 50 (used during distribution). The memory word thus received and held in registers 1, 2, 3 and 19 is then operated upon by the circuitry in FIGURES 2*a* and 2*b* and is subsequently returned to memory via the cable 16 when the associated line is disconnected from the lines 5 and 50. The apparatus of FIGURES 2*a* and 2*b* will be explained with the simplification that only one memory word, corresponding to one line connected to the lines 5 and 50, is present in the registers 1, 2, 3 and 19 at all times; though, it will be understood that the memory word is only intermittently present.

The assembly/distribution register 1 comprises twelve orders R1 through R12 for holding elements or bits. The twelfth order R12 is an extra position used only for entry of bits and does not store bits longer than the interval between entry and shifting. (Since, as explained above, shifting may in fact occur before entry, this order is not essential.) It is therefore not necessary to provide a bit position in the memory word of FIGURE 2c for the twelfth order R12. A signal from the OR circuit 41 shifts the contents of the orders of the assembly/distribution register 1 to the right one position, causing the contents of each order to appear in the adjacent lower order. Data is entered into the assembly/distribution register 1 via OR circuits 49 of which each order 01 through 012 corresponds to one order of the assembly/distribution register 1. Serially received input elements from the line 5 are entered into one of the orders of the assembly/distribution register 1 via an eleven order set of entry AND gates 7, only one of which is enabled at any one time, depending upon signals ($n=1$ or $n=2$, etc.) applied via cable 29. The activated one of the entry AND gates 7 connects the input line 5 to the corresponding order of the assembly/distribution register 1 via the cable 42 and the corresponding order of the OR circuit 49. As will be explained below, there is no provision for an entry AND circuit 7 corresponding to the lowest order of the assembly/distribution register 1 because data entered from the line 5 is shifted right in the assembly/distribution register 1 prior to utilization, and would therefore be lost if entered into the lowest position. A character from a processor on a cable 6 may be placed in parallel into corresponding orders of the assembly/distribution register 1 by activation of AND gates 9 which send the character to cable 43 and OR circuits 49. Data is removed in parallel from the assembly/distribution register 1 for transfer to a processor, via cable 60, by means of exit AND gates 8 comprising eleven orders, one of which is provided for each order of the assembly/distribution register 1 except the highest order R12. The AND circuits 8 are all operated together during transmission of signals in the start-stop code, but are used to mask out the high orders of the register 1, under control of the cable 30, during synchronous transmission, as will be explained below.

The character length register 2 comprises four orders R27 through R30 which are given the binary weights 1, 2, 4 and 8, respectively. The value ($n$) stored in the character length register 2, which represents the number of elements in the character currently being operated upon, is placed onto cable 31 and is made available to entry and masking control 28 via cable 32 and to comparator 4 via cable 33.

The character control counter 3 is a four-position register comprising orders R15 through R18 assigned the binary weights 1, 2, 4 and 8. The application of a signal to a count +1 line 61 causes the value ($m$) stored in the character control counter 3 to be incremented by the decimal value one. A signal applied on the line 62 causes the character control counter 3 to be reset to the decimal value zero. The contents of the character control counter 3 are made available to comparator 4.

The tag register 19 comprises two orders R12 and R14 representative of the send/receive (SR) and synchronous/start-stop (YS) tag bits, respectively. The values stored in the tag register 19 are made available a set of circuits 20 comprising convert circuits C12 and C14. When the order R12 of tag register 19 contains a 0-bit, the $SR=0$ (receive) output of the convert circuit C12 will have a signal present on it. In this way, the outputs of the convert circuit C12 indicate whether the tag register 19 specifies a send or a receive operation. Similarly, the bit stored in order R14 of tag register 19 operates convert circuit C14 to indicate that start-stop characters ($YS=0$) or synchronous characters ($YS=1$) are being operated upon.

The comparator 4 compares the value ($m$) currently stored in the character control counter 3 with the value ($n$) stored in corresponding orders of the character length register 2. Comparison may for example be accomplished by means of a set of Exclusive OR circuits 22, an OR circuit 21 and an inverter 53. The Exclusive OR circuits operate to give a 1-bit output only if the inputs differ. Therefore, if the value ($n$) in the character length register 2 and the value ($m$) in the character control counter 3 are identical, none of the Exclusive OR circuits 22 will have a 1-bit output. As a result, there will be no 1-bit output from OR circuit 21, but there will be a 1-bit output from the inverter 53, which output appears as a signal on $n=m$ line 62. If any bits in corresponding orders of the character length register 2 and character control counter 3 differ, there will be a 1-bit output from the corresponding Exclusive OR circuit in the Exclusive OR circuits 22. This will cause a 1-bit output from the OR circuit 21 which prevents a 1-bit output from appearing at inverter 53 on output line 62. Any other type of comparator may be used.

The entry and masking control 28 serves to control the entry of elements from the line 5 via the entry AND gates 7 into one order of the assembly/distribution register 1, and the masking of undesired bits (which may be generated during synchronizing operation) from the unutilized orders of the assembly/distribution register 1 by means of the exit AND gates 8. Convert circuits 23 receive a value ($n$) indicating the number of elements in the currently operated upon character from corresponding orders of the character length register 2. A decoder 24 converts this binary information into a signal on one of the lines $n=1$ through $n=11$. (This binary to decimal conversion operation may, however, be accomplished in any one of a number of other well-known means utilizing any desired prior art logic circuitry.) For example, if the character length register 2 contains the decimal number 7 (0111) outputs $\overline{8}$, 4, 2 and 1 of convert circuits 23 will cause a signal to appear on decoder 24 output line $n=7$. The outputs of the decoder 24 are applied to the entry AND gates 7 via cable 29, and to masking AND gates 25 via cable 34. Since only one of the decoder 24 outputs is selected at any one time, only one of the eleven orders (&2–&12) of entry gates 7 and one of the eleven orders (&1–&11) of masking gates 25 will be selected. The line 5 is connected via the entry AND gates 7 to all eleven of the orders of the entry gates 7. Only the one entry gate order connected to the one active decoder 24 output will pass a signal from line 5 to cable 42 and thus to an order of the assembly/distribution register 1. As can be seen from the drawings, the line 5 is (in effect) connected to the assembly/distribution register 1 order ($n+1$) which is one greater than the number ($n$) of elements in the character being received, since each received element is immediately shifted to the right one position (to order $n$) before utilization. If, on the other hand, shifting were performed prior to, or at the same time as, entry, then each element could be directly entered into its proper order ($n$). The particular circuits chosen being obviously a matter of choice not essential to the practice of the invention. The outputs of the decoder 24 are also applied to the masking AND gates 25, which gates comprise one AND circuit for each one of the decoder 24 outputs $n=1$ through $n=11$. The masking AND gates 26 are used only during receipt of synchronous characters (which comprise all variable characters), but may if desired be modified for use during receipt of start-stop characters (which contain in this example, two invariable bits). The output of the eleven orders &1 through &11 of AND circuits 25 are applied to corresponding OR circuits 26 orders 01 through 011 inputs. When one of the decoder 24 outputs $n=1$ through $n=11$ is activated, the corresponding OR circuit order, and all of the OR circuits orders to the right of the masking gate 25 order corresponding to the activated decoder output will be activated. For example, output $n=7$ of decoder 24 causes an output from the seventh order 87 of masking AND gates 25 which results in outputs from seven OR circuits 01 through 07. The outputs of the OR circuits are applied via cable 30 to the exit AND gates 8, only the portion of the contents of the assembly/distribution register 1 specified by the OR circuits 26 being passed by the exit AND gates 8. Thus, during assembly of synchronous characters, the masking gate 25 and OR circuits 26 cause the exit gates 8 to "mask" out the undesired high order bits. During the assembly of start-stop characters, the output of an AND circuit 71 is applied to the eleventh order (and therefore to all orders) of the OR circuits 26, activating all of the exit AND gates 8.

A timing ring 18 comprises a four-position register having orders R*t*1 through R*t*4 which are operated in sequence by an oscillator 17 via a stop ring line. Each pulse from the oscillator 17 causes a signal to appear on a different one of output lines *t*1 through *t*4, which are used to operate transfer controls.

The transfer controls are shown in FIGURES 2*a* and 2*b* as a number of AND and OR circuits which operate the registers and control data transfers among the registers. The controls operate in four "modes" as a function of tag bits stored in the tag register 19, as shown in the following table:

TABLE

| Mode | R12 | R14 |
|---|---|---|
| 1 | Assembly (SR=0) | Synchronous (YS=1). |
| 2 | Assembly (SR=0) | Start-stop (YS=0). |
| 3 | Distribution (SR=1) | Synchronous (YS=1). |
| 4 | Distribution (SR=1) | Start-stop (YS=0). |

At the beginning of each operation, the character register 19 will be set to indicate one of the four modes for operation of the invention, and will remain so set for the duration of the operation.

A control AND circuit 51 controls entry of serial bits, from the line 5 through the entry AND gates 7, into one order of the assembly/distribution register 1; being operated at time *t*1, when the timing ring 18 places a signal on line *t*1, if the apparatus is in either one of the two assembly modes (mode 1 and mode 2), as indicated by a signal *SR*=0. The output of the AND circuit 51 is applied to all order of the entry AND circuits 7, only one of which is, however, operated since the entry and masking control 28 enables only one of the orders.

A control AND circuit 52 controls the entry of parallel character bits from a processor via cable 6 through AND circuits 9 into the assembly/distribution register 1. This AND circuit 52 applies a signal to all orders of the AND circuits 9, during either of the two distribution modes (modes 3 and 4 during which there is a signal on line *SR*=1), if the comparator 4 indicates, by a signal on *n*=*m* line 62, that the contents (*m*) of the character control counter 3 and the contents (*n*) of the character length register 2 bear a predetermined relationship (i.e. in this embodiment, they are equal).

The assembly/distribution register 1 shifting operation is controlled by control AND circuits 13, 37, 38 and 39 and control OR circuits 40 and 41. Normally, in all modes, the assembly/distribution register 1 contents are shifted right one position by the application of a signal to the OR circuit 41 at time *t*2. In the case (mode 2) of the assembly of start-stop characters an additional shift is perfomed at time *t*3. The AND circuit 37 will apply a signal to OR circuit 41 at time *t*2 during each of the two distribution modes (modes 3 and 4, as evidenced by a signal on line *SR*=1). The AND circuit 38 will apply a signal to OR circuit 41 at time *t*2 during the assembly of synchronous characters (mode 1: *SR*=0, *YS*=1). The AND circuit 39 will normally have an output, at time *t*2, during the assembly of start-stop characters (mode 2: *SR*=0, *YS*=0). The AND circuit 39 will also have an additional output at time *t*3 during the assembly of start-stop characters (mode 2) when the assembly of a full character causes a signal to appear on SS line 47 to AND circuit 13. Referring to control AND circuit 14, an output occurs on SS line 47 to indicate the assembly of a full start-stop character in the assembly/distribution register 1, during the assembly of start-stop characters (mode 2: *YS*=0, *SR*=0) if two additional conditions are recognized; these conditions being (1) the recognition of a start bit (invariably a 1-bit) in the lowest order of the assembly/distribution register 1 in conjunction with (2) the reception of a stop bit (invariably a 0-bit) from the line 5. The presence of the start bit in the lowest order of the assembly/distribution register 1 is conveyed to the AND circuit 14 via the *R*1=1 line 48. The reception of a stop-bit is indicated to the AND circuit 14 by a signal on the *IDB*=0 line 58. A signal is placed on the *IDB*=0 line 58 from an incoming data bit register 36 which receives bits as read from the line 5. The last bit received from the line 5 will be retained in the register 36 even though it has been shifted from one order to another order in the assembly/distribution register 1. Obviously, the register 36 would not be necessary if the register 1 were shifted prior to entry of a new bit. (Further, the detection of stop-bit would not be necessary, if the start-bit could always be identified as the only one in the lowest order of register 1).

Control AND circuit 10 is used during distribution operations (modes 3 and 4: *SR*=1) to transfer to the line 50 a bit currently in the lowest order of the assembly/distribution register 1. A signal appears at the output of the AND circuit 10, equivalent to the bit stored in the lowest order of the assembly/distribution register 1, at time *t*1.

The contents of the assembly/distribution register 1 are gated to the processor via cable 60 at time *t*4 due to the operation of control AND circuits 12, 44 and 46 and control OR circuits 70. The exit AND gates 8 are all operated simultaneously by the output of AND circuit 44 at time *t*4 during assembly operations (modes 1 and 2: *SR*=0), if there is an output from OR circuit 70. There will be an output from OR circuit 70, due to the operation of AND circuit 12, after the assembly of a complete start-stop character (mode 2: *SR*=0, *YS*=0), a complete start-stop character being recognized by means of a signal on the SS line 47 as previously explained. There will also be an output from the OR circuit 70 during the assembly of synchronous characters (mode 1: *SR*=0, *YS*=1) when the character length register 2 contents (*n*) and character control counter 3 contents (*m*) bear a predetermined relationship (equally) as evidenced by a signal on the *n*=*m* line 62 from the comparator 4.

The control AND circuit 27 and the control AND circuit 71 control the operation of the entry and masking control 28. During the assembly of synchronous characters (mode 1: *YS*=1, *SR*=0), an output from the AND circuit 27 permits one of the AND circuits 25, selected by the decoder 24, to operate the exit AND gates 8 to mask out undesired bits. During the assembly of start-stop characters (mode 2: *SR*=0, *YS*=0) the AND circuit 71 output operates all of the exit AND gates 8 to pass the entire character stored in the assembly/distribution register 1 to the cable 60.

*Detailed description—Operation*

Figures 3A, 3B, 3C, 3D:
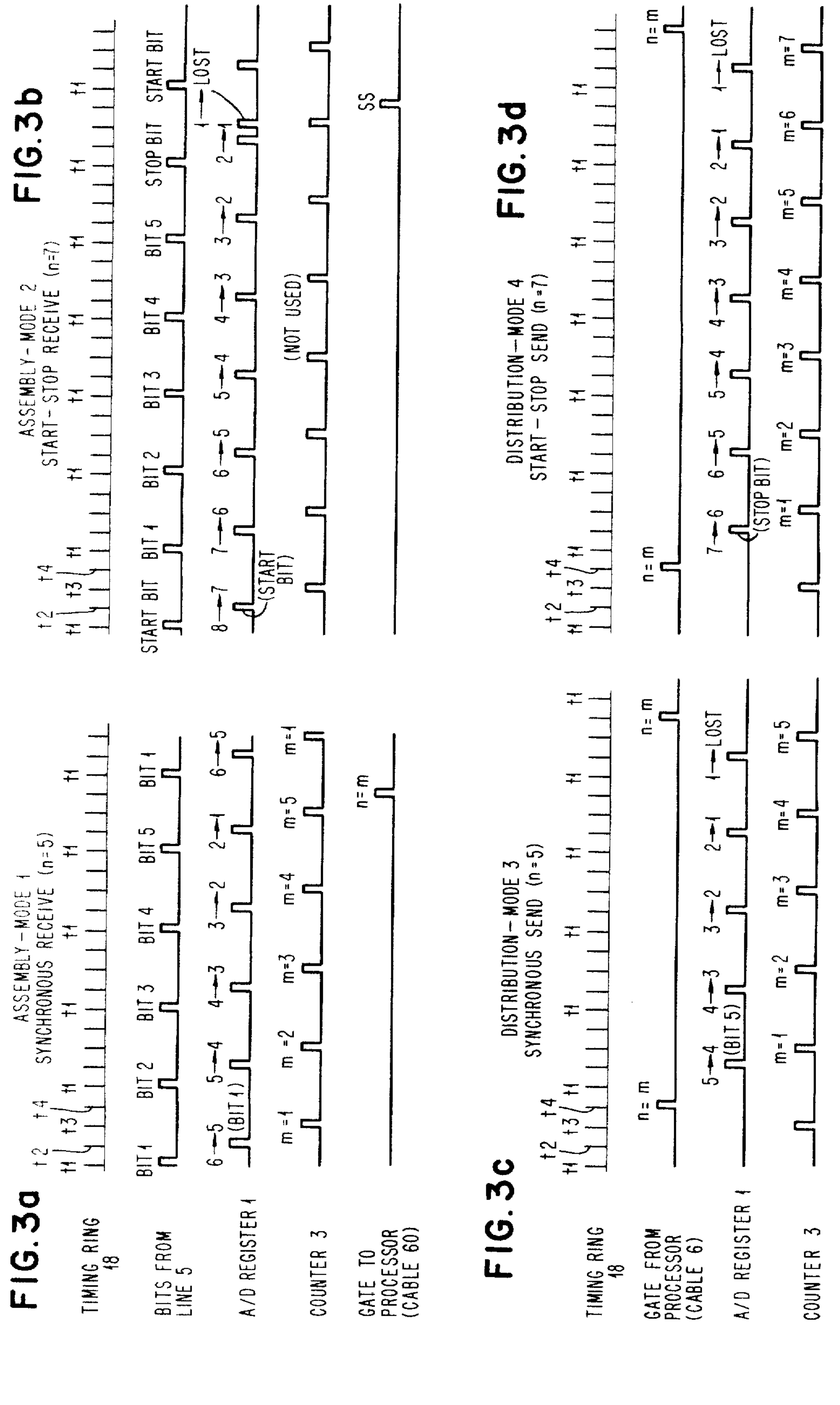

Referring to FIGURES 3*a*, 3*b*, 3*c* and 3*d* the operation of the apparatus of FIGURES 2*a* and 2*b* in each of its four modes will be explained. FIGURES 3*a* and 3*b* show signals present during assembly operations. The timing ring 18 outputs are indicated in the first line of FIGURES 3*a* and 3*b*, and bits received from the line 5 are identified in the second lines. The position of the first bit received in the assembly/distribution register 1, during successive shifts, is indicated in the third line and the value ($m$) stored in the counter 3 (for mode 1 only) indicated in the fourth line. The fifth line shows signals controlling the transfer of the contents of the assembly/distribution register 1 to the processor via cable 60. FIGURES 3$c$ and 3$d$ also show the timing ring 18 outputs in the first lines. The second lines show signals controlling the entry of characters from the processor on cable 6 into the assembly/distribution register 1. The position of the highest order bit to be distributed in the assembly/distribution register 1 is shown, during successive shifts, in the third lines and the contents ($m$) of the counter 3 are shown in the fourth lines.

Referring first to FIGURE 3$a$, the assembly of a synchronous character (mode 1) having five variable elements will be described. Initially a memory word having a character control field set to the value ($m$=0), a character length field set to the value ($n$=5), an assembly/distribution field of zeros and tags $SR$=0 and $YS$=1 is placed into the registers 1, 2, 3 and 19. Control signals will immediately appear on the lines $SR$=0 and $YS$=1. The oscillator 17 will cause the timing ring 18 to step from time $t$1 through $t$4 and then to $t$1 again, as shown by the first line of FIGURE 3$a$. The value ($n$=5) stored in the character length register 2 causes signals to be applied via cable 31 to the orders C27 and C29 of the convert circuits 23 in the entry and masking control 28. As a result, the decoder 24 will have an output on line $n$=5 which is applied via cable 29 to the sixth order of entry AND gates 7 (and via cable 34 to the fifth order of masking gates 25). At time $t$1, the AND circuit 51 will cause the first bit at input 5 to be passed through the sixth order of the AND circuit 7 and through the sixth order of the OR circuits 49 into the sixth order of assembly/distribution register 1. At time $t$2, an output will appear from AND circuit 38 and will be applied via OR circuit 41 to shift the first bit placed in the assembly/distribution register 1 from the sixth order to the fifth order. At time $t$3, a signal is applied on counter +1 line 61 to increment the contents ($m$=0) of the character control counter 3 from zero to one. Since the value ($n$=5) stored in the character length register 2 does not equal the current value ($m$=1) stored in the character control counter 3, there will be no output on the $n$=$m$ line 62 from the comparator 4 at this time. During successive cycles of the timing ring 18, bits two through five of the character are received from the line 5 and entered, in turn, into the sixth order of the assembly/distribution register at each time $t$1. At each time $t$2, the bit entered into the sixth order of the assembly/distribution register 1 is shifted into the fifth order, the bit previously shifted into the fifth order is shifted into the fourth order, etc. At each occurrence of time $t$3, the counter 3 is incremented by one. Finally, at the fifth occurrence of time $t$1, the fifth bit of the character is entered into the sixth order of the assembly/distribution register 1. At the following time $t$2 this fifth bit is shifted into the fifth order of the assembly/distribution register 1, the fourth bit is shifted into the fourth order, the third bit is shifted into the third order, etc., each bit of the character occupying its corresponding order, the first received bit being shifted into the lowest order of the assembly/distribution register 1. At the subsequent time $t$3, the counter 3 is incremented to the value ($m$=5). The character length register 2 applies 1-bit inputs to the first and fourth orders of the Exclusive OR circuits 22 as does the character control counter 3. As a result, there will be no 1-bit inputs to the OR circuit 21 and there will be a 1-bit output from the inverter 53. Thus, the comparator 4 emits a signal on the $n$=$m$ line 62 which is applied at time $t$4 to all of the exit AND gates 8 via the control AND circuits 46 and 44, the lines $YS$=1 and $SR$=0 having signals on the $m$ in the first mode. The AND circuit 27 in the entry and masking control 28 supplies a signal to all orders of the masking gates 25, the fifth order of which supplies a signal (since its input $n$=5 is activated) to the fifth order of OR circuits 26 activating orders 01 through 05 of the OR circuits 26. All corresponding orders &1 through &5 of the AND circuits 8 are activated to pass only the desired 5-bit character from the assembly/distribution register 1 to the cable 60 in parallel.

Referring now to FIGURE 3$b$, the assembly of a seven-element start-stop character (mode 2) having two invariable elements will now be described. Initially, the register 1 is reset to all zeros, the character length register 2 will be set to the value $m$=7, the character control counter 3 (though not used) will be set to $m$=0 and the character register 19 will be set in a manner causing signals to appear on lines $SR$=0 and $YS$=0. The value ($n$=7) stored in the character length register 2 causes inputs to orders C27, C28 and C29 of the convert circuits 23, an output $n$=7 from the decoder 24 being applied via cable 29 to the eighth order of the entry AND gates 7. As previously described for mode 1, with reference to FIGURE 3$a$, successive bits from the line 5 will be received and passed by the entry AND gates 7 to the assembly/distribution register at each time $t$1. The bits, in this case, being entered into the eighth order of the assembly/distribution register 1. As also previously described, at each time $t$2 all of the bits held in the assembly/distribution register 1 will be shifted right one position, this time under the control of AND circuit 39 and OR circuit 40. Further, the character control counter 3 is incremented as previously described at each occurrence of time $t$3. During the seventh cycle of the timing ring 18 the seventh bit (stop bit) of the incoming character is received on the line 5 and entered into the eighth order of the assembly register 1. Bits, as received, are stored in the incoming data bit register 36 at the same time that they are entered into the assembly/distribution register 1; the stop bit being held in the incoming data bit register 36 as a result. At time $t$2 the stop bit is shifted from the eighth order of the assembly/distribution register 1 to the seventh order at the same time that the start bit is shifted into the first order of the assembly/distribution register. Thus, the seven elements of the received start-stop character are now contained in the lowest seven orders of the assembly/distribution register 1. The contents of the lowest order (a start bit having a value of one) is sensed by the AND circuit 14 via line 48. The AND circuit 14 also senses the contents (a stop bit having a value of zero) of the seventh order (which is also contained in the incoming data bit register 36) via the line 58 from the incoming data bit register 36. As a result, a signal appears on SS line 47 causing AND circuit 14 to shift the contents of the assembly/distribution register 1 an extra position to the right at time $t$3. This shifts the start bit (value of one) out of the lowest order of the assembly/distribution register 1, the stop bit (value of zero) being shifted into the sixth order of the assembly/distribution register 1. Referring to the entry and masking control 28, signals on the lines $SR$=0 and $YS$=0 are applied to the AND circuit 71 causing outputs from orders 01 through 012 of the OR circuits 26, which outputs are applied via cable 30 to all of the orders of the exit AND gates 8. At time $t$4 a signal is supplied to the exit AND gates 8 via the control AND circuits 12 and 44 to gate out eleven orders (including the assembled character) of the assembly/distribution register 1 and transfer them to the cable 60. Since the stop bit (contained in the sixth order) is a zero, it will be ignored by the processor as will all higher order positions transferred to the cable 60.

Referring now to FIGURE 3$c$, the distribution of a synchronous character (mode 3) having five variable elements will be described. Initially the five elements of the character are placed into the five lower orders of the assembly/distribution register 1 and the tag register 19 is set in a manner placing signals on the lines $SR$=1 and $YS$=1. The character control field is set to $m$=0 and the character length field places the value $n$=5 into the character length register 2. At time $t$1, the AND circuit 10 is enabled to pass the contents (bit 1) of the lowest order of the assembly/distribution register 1 to the line 50. At time $t2$, the AND circuit 37 causes the contents of the assembly/distribution register 1 to be shifted to the right one position, bringing the next bit (bit 2) into the lowest order of the assembly/distribution register 1. At time $t3$, the character control counter 3 contents ($m=0$) are incremented from zero to one. Since the contents ($m=1$) of the character control counter 3 do not equal the contents ($n=5$) of the character length register 2, there will be no output on the $n=m$ line 62 from the comparator 4 at time $t4$. These operations will be repeated, one bit at a time being sent from the lowest order of the assembly/distribution register 1 onto the line 50 at each time $t1$, the contents of the assembly/distribution register 1 being shifted at each time $t2$ and the character control counter 3 being incremented at each time $t3$. Finally, the fifth bit of the character is shifted into the lowest order of the assembly/distribution register 1. At the following time $t1$ this bit is transmitted on the line 50, at time $t2$ it is shifted from the lowest order of the assembly/distribution register 1 and is lost, and at the following time $t3$ the character control counter 3 is incremented from four to five. Since the contents ($m=5$) of the character control counter 3 now equal the contents ($n=5$) of the character length register 2, there will be an output from the comparator 4 on $n=m$ line 62. This signal is applied to AND circuit 52 so that at time $t4$ the next character is transferred via AND circuits 9 into the assembly/distribution register 1.

Referring now to FIGURE 3*d*, the distribution of a start-stop character (mode 4) having five variable elements and two invariable elements will be briefly described. The operation of the apparatus for this case is generally the same as the operation of mode 3, described with reference to FIGURE 3*c*. Initially a seven element character is placed into the lowest seven orders of the assembly/distribution register 1 and the value ($n=7$) is placed into the character length register 2. The tag register 19 assumes states which cause signals to appear on lines $SR=1$ and $YS=0$. As previously described with reference to FIGURE 3*c*, a bit is sent from the lowest order of the assembly/distribution register 1 to the line 50 whenever the timing ring 18 places a signal on the line $t1$. At each following time $t2$ the assembly/distribution register 1 contents are shifted right one position under the control of the AND circuit 37, and at each time $t3$ the contents ($m$) of the character control counter 3 are incremented by one. When the seventh (stop bit) is in the lowest order of the assembly/distribution register 1 it is transmitted to the line 50 as previously described with reference to the fifth bit in FIGURE 3*c*. At this time the value ($m=7$) in the character control counter 3 equals the value ($n=7$) in the character length register 2. Therefore, a signal appears on the comparator 4 output line 62 which is at time $t4$ effective to transfer, in parallel, a new character from the processor cable 6 into the assembly/distribution register 1.

There has been described apparatus capable of assembling and distributing characters composed of a wide variety of numbers of variable and invariable elements. A register is used to indicate the number of elements in characters assembled and distributed, a counter indicating the current number of elements either assembled or distributed. When the contents of the register and counter bear a predetermined relationship the assembled character is sent to a utilization device or a new character for distribution is obtained. During assembly, circuits for masking undesired elements from characters, prior to transfer to the utilization device, are described. During the assembly of characters having invariable elements, special circuitry is provided for recognizing the need to send the completely assembled character to the utilization device, the counter not being used for this purpose. In this latter case, one of the invariable elements is automatically separated from the variable elements prior to the transfer of the character of the utilization device.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for assembling and distributing characters having all variable elements and characters having mixed variable and invariable elements, including:
control means, operable to generate two simultaneous signals each of which may assume either one of two values, a first signal indicating by one value an assembly operation and by the other value a distribution operation, a second signal indicating by one value operations involving characters with variable elements and by the other value operations involving characters with invariable elements;
an indicator register, for indicating as a value the number of elements included in a character;
a plural order shift register, connected to said control means and to said indicator register, operable in accordance with a first signal indicating an assembly operation to sequentially receive and hold elements in an incoming order determined by the value in said indicator register and to shift the elements in each order to an adjacent lower order to make said incoming order available for the next element, and operable in accordance with a first signal indicating a distribution operation to hold elements placed simultaneously into a number of the lowest orders of said shift register and to shift the elements in each order to an adjacent lower order making each element in turn available to the lowest order;
and character recognition means, associated with said shift register and said indicator register, operable in accordance with a second signal to generate a recognition signal when the number of shifts performed by said shift register bears a predetermined relationship to the value in said indicator register, and operable in accordance with a second signal indicating characters with invariable elements to generate said recognition signal when said invariable elements are recognized.

2. The apparatus of claim 1, wherein said recognition means includes:
a counter, connected to said shift register, operable to record the number of shifts performed by said shift register;
and a comparator connected to said counter and to said indicator register, operable to generate said recognition signal when the number of shifts recorded in said counter equals the value in said indicator register.

3. The apparatus of claim 1, wherein said recognition means includes:
a logical circuit, connected to the lowest order of said shift register, operable in accordance with the presence of a predetermined element in said lowest order to generate said recognition signal.

4. The apparatus of claim 2, wherein said recognition means further includes:
a logical circuit, connected to the lowest order of said shift register, operable in accordance with the presence of a predetermined element in said lowest order to generate said recognition signal.

5. A character assembler, comprising:
means for receiving characters, each character being manifested by a number of serially received bits;
means for indicating the number of bits currently manifesting received characters;
plural order storage means, connected to said receiving means and to said indicating means, for initially holding, in a one of said plural orders determined by said indicating means, each bit in turn received by said receiving means;

and shifting means, connected to the orders of said storage means, operable at regular times to transfer bits held in said orders to adjacent lower orders.

6. The character assembler of claim 5, further comprising:

registering means, associated with said storage means, for registering the number of bits of a received character currently held by said storage means;

and recognition means, connected to said registering means and to said indicating means for generating a signal when said registering and indicating means specify that the storage means currently holds said number of bits currently manifesting received characters.

7. The character assembler of claim 5, wherein the first bit of each character is defined as a start-bit and the last bit of each character is defined as a stop-bit, further comprising:

detection means, connected to said receiving means and to the lowest order of said storage means, for generating a signal when said receiving means receives a stop-bit and said lowest order holds a start-bit.

8. The character assembler of claim 7, further comprising:

stripping means, connected to said detection means and to said shifting means, operable by said signal to cause said shifting means to transfer bits to adjacent lower storage means orders at an extra irregular time, to strip the start-bit from the received character.

9. The character assembler of claim 6, further comprising:

masking means, connected to said detection means and to said storage means, operable by said signal, to transfer from the storage means only said number of bits registered by said registering means.

10. A character distributor, comprising:

a source operable by a signal to supply characters to be distributed, each character being manifested by a number of parallel bits;

plural order storage means, connected to said source, for initially holding in the lowest orders said number of bits manifesting a character;

shifting means, connected to the orders of said storage means, operable at regular times to transfer bits held in said orders to adjacent lower orders;

transmitting means, connected to the lowest order of said storage means, for serially transmitting bits initially held in said lowest order and the bits regularly transferred into said lowest order;

means for indicating the number of bits currently manifesting a character;

registering means, associated with said transmitting means, for registering the number of bits, of the number currently manifesting a character, transmitted by said transmitting means;

and signalling means, connected to said registering means, said indicating means and said source, for generating a signal making said source operable to supply a new character when said registering and indicating means together specify that the transmitting means has transmitted all the bits currently manifesting a character.

References Cited by the Examiner

UNITED STATES PATENTS

| | | | |
|---|---|---|---|
| 3,030,609 | 4/1962 | Albrecht | 340—172.5 |
| 3,141,151 | 7/1964 | Gilson | 340—172.5 |
| 3,154,770 | 10/1964 | Schwab et al. | 340—172.5 X |

ROBERT C. BAILEY, *Primary Examiner.*

P. J. HENON, *Assistant Examiner.*